United States Patent [19]

Frick

[11] Patent Number: 4,466,290
[45] Date of Patent: Aug. 21, 1984

[54] APPARATUS FOR CONVEYING FLUID PRESSURES TO A DIFFERENTIAL PRESSURE TRANSDUCER

[75] Inventor: Roger L. Frick, Eden Prairie, Minn.

[73] Assignee: Rosemount Inc., Eden Prairie, Minn.

[21] Appl. No.: 325,342

[22] Filed: Nov. 27, 1981

[51] Int. Cl.$^3$ .......................... G01L 7/08; G01L 9/12
[52] U.S. Cl. ........................................ 73/756; 73/718; 73/861.47
[58] Field of Search .................... 73/756, 716–722, 73/706, 861.47, 861.48; 285/137 R; 361/283; 137/594

[56] References Cited

FOREIGN PATENT DOCUMENTS 1572814  8/1980  United Kingdom .................. 73/718

OTHER PUBLICATIONS

Agco Manifolds, by Anderson, Greenwood & Co., Catalog 3000, Revised Oct. 1980.
Model 1151DP Alphaline Differential Pressure Transmitter, Product Data Sheet 2256, Rosemount Inc., Eden Prairie, MN, Revised Feb. 1978.
Series 4000 Differential Pressure Transmitters –KDG Instruments Ltd., (published prior to Nov. 27, 1980).
Brochures of D/A Mfg. Co., Box T, Tulia, TX 79088, D/A "Unimount", published in Sep. 1978.
D/A "Creators of the New Generation Manifolds", (publication date unknown).
D/A Model PTM-6, (publication date unknown).
D/A Zeroing Manifold, (publication date unknown).
D/A Minimatic, (publication date unknown).
D/A Model MM-4BF All Flange, "Minimatic", (publication date unknown).
D/A Model SBZ-43, (publication date unknown).
D/A Product Guide, published Jun. 1, 1981.

*Primary Examiner*—Donald O. Woodiel
*Attorney, Agent, or Firm*—Kinney & Lange

[57] ABSTRACT

An improved apparatus for conveying fluid pressures to a differential pressure transducer is disclosed. The apparatus comprises a single flange connected to and fluidly coupled to the differential pressure transducer for conveying the fluid pressures thereto. A further improvement comprises incorporating a three valve manifold integral to the single flange for controlling the fluid pressure to the differential pressure transducer.

16 Claims, 7 Drawing Figures

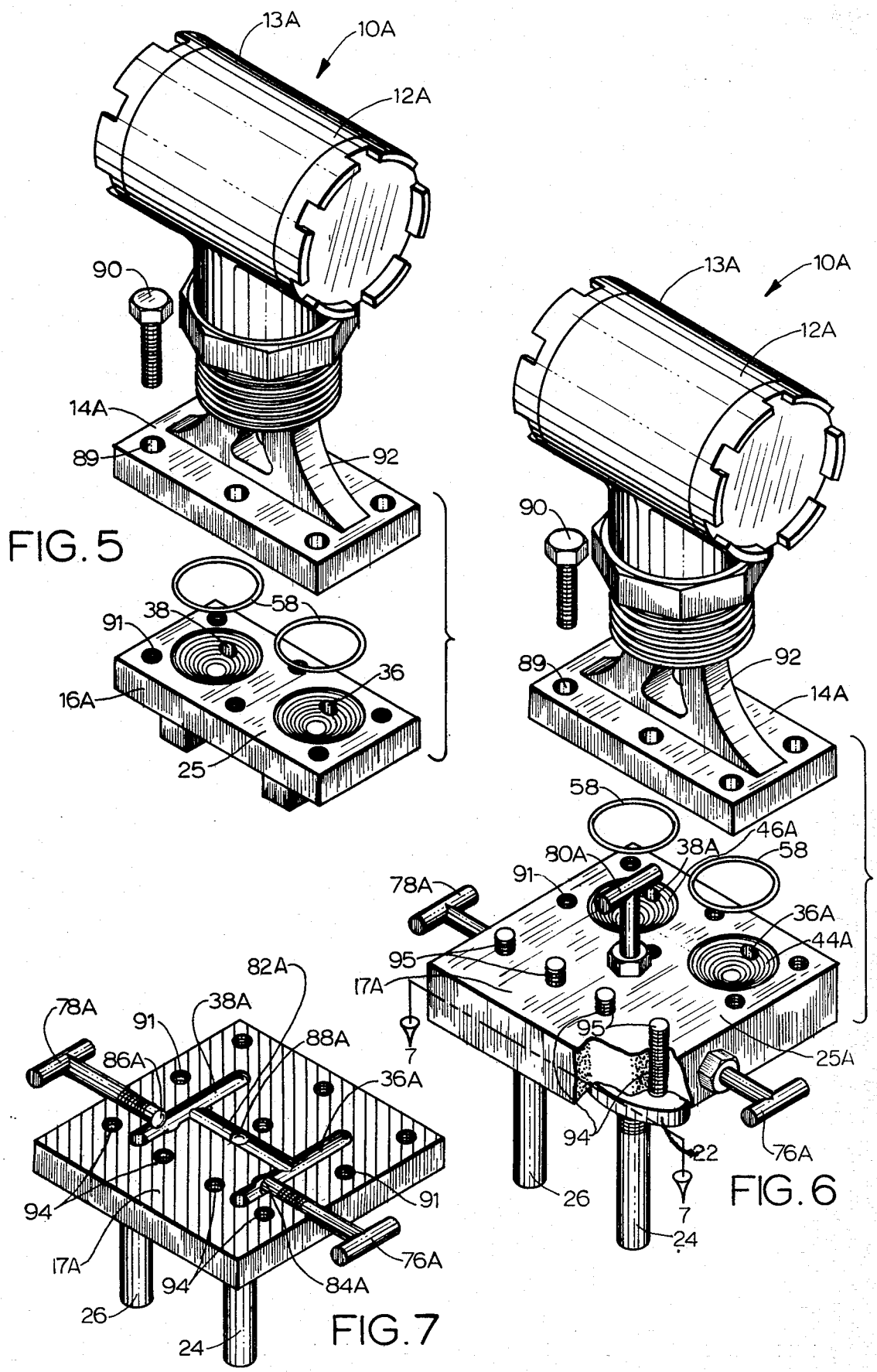

APPARATUS FOR CONVEYING FLUID PRESSURES TO A DIFFERENTIAL PRESSURE TRANSDUCER

BACKGROUND OF THE INVENTION

1. Field of the Invention

The present invention relates to a device for conveying fluid pressures to a differential pressure transducer. This device comprises a single flange. A further improvement incorporates a three way valve manifold integral in the single flange.

2. Description of the Prior Art

In the prior art, differential pressure transmitters are disclosed. Typically a differential pressure transmitter consists of three functional sub groups: flanges, a transducer, and an input/output unit. To sense differential pressure, the transmitter compares two fluid pressures. The fluid pressures are separately conveyed to the transducer by two flanges, mounted on opposite sides of the transducer. Each flange is connected to an impulse piping leg which in turn is connected to a conduit containing fluid under pressure. Each flange is typically separately cast or machined from stainless steel. Where the fluid presents a rigorous corrosive environment, they are constructed of more costly materials, including alloys sold under the trademarks Monel and Hastelloy. The transducer has two separate oppositely facing portions, each of which is affected by one of the two fluid pressures and in response generates an input signal representative of the differential in such pressures. This signal is sent to the input/output unit. The input/output unit functions to power the transducer, to receive the differential pressure input signal from the transducer, to transform the input signal into an industry standardized signal representative of differential pressure and to output that standardized signal for use external to the differential pressure transmitter. A typical prior art transmitter is detailed in product literature of Rosemount Inc., Eden Prairie, MN, the assignee of this application, describing their Model 1151 Differential Pressure Transmitter.

A three valve manifold has frequently been used with a differential pressure transmitter. It has typically been interposed between the conduit and the flanges of the differential pressure transmitter by plumbing it directly to the impulse piping and bolting it to each of the flanges, utilizing o-rings to effect the seal therebetween. Alternatively, the three valve manifold has been installed by similarly plumbing it directly to the impulse piping but interposing short additional sections of impulse piping between the manifold and each of the flanges.

The three valve manifold is used to typically perform three functions: (1) to selectively admit fluid pressure from both impulse piping legs to affect the transducer, (2) to exclude fluid pressure from one impulse piping leg while admitting fluid pressure from the other impulse piping leg to affect both portions of the transducer, and (3) to isolate the transducer completely from the fluid pressure from both impulse piping legs. A typical prior art three valve manifold is detailed in the product literature of Anderson, Greenwood & Co. of Houston, Tex., entitled AGCO Manifolds, Catalog 3000, Revised October 1980.

It is desirable to provide the above listed fluid pressure conveying functions both at reduced cost and with increased safety. This invention provides a single flange that performs the same function as the two flanges previously did. A further refinement incorporates a three valve manifold integral to the single flange. This combination performs the same function as the separate three valve manifold plus the two flanges, which were required prior to this invention. The result in both cases is a functional cost savings due to the invention.

Also important is the aspect of increased safety. It is recognized that the impulse piping conveys whatever process fluid is flowing in the conduit. This fluid may be at high pressure and/or temperature. Likewise, it may be caustic, acidic, flammable or noxious. As such, it constitutes a distinct hazard. In order to minimize this hazard, it is desirable to minimize the number of fluid connections associated with a differential pressure transmitter, as such connections are potential sources of dangerous leakage. Prior to this invention, the minimum number of such connections providing functional equivalence to the single flange with integral three valve mainfold was six; two from the impulse piping to the three valve manifold, two to the flanges and two to the transducer. This invention reduces the number of connections to four; two from the impulse piping to the flange with integral three valve manifold and two from such flange to the transducer.

SUMMARY OF THE INVENTION

The invention is an improved apparatus for conveying fluid pressures to a differential pressure transducer, wherein the improvement comprises a single flange connected to and fluidly coupled to the differential pressure transducer for conveying the fluid pressure to such transducer. In one preferred embodiment, the apparatus is further improved by incorporating integral in the single flange a three valve manifold for controlling the fluid pressures to the manifold. In another preferred embodiment the single flange, both with and without the integral three valve manifold, is a major component of a differential pressure transmitter and, as such, also comprises an improvement to the transmitter.

The single flange has a first and a second fluid passageway defined in the flange and coupled to first and second impulse piping legs respectively. Such passageways transmit fluid pressure from the respective impulse piping leg separately to the transducer. When the three valve manifold is integrated with the flange, a cross-connect passageway is defined in the flange that extends between and intersects the fluid passageways for effecting fluid pressure exchange therebetween. A first valve is mounted in the first fluid passageway and a second valve is mounted in the second fluid passageway. Each valve is located between the point of intersection of the cross-connect passageway with the respective fluid passageway and the point of the coupling to the respective impulse piping leg and functions to selectively fluidly isolate or connect the transducer to the fluid pressure from the respective impulse piping leg. A third valve is mounted in the cross-connect passageway to selectively fluidly connect the first and second fluid passageways to each other.

BRIEF DESCRIPTION OF THE DRAWINGS

FIG. 5 is an exploded view of another preferred embodiment of the single flange connected to a differential pressure transmitter, FIG. 6 is an exploded view of another preferred embodiment of the single flange with integral three valve manifold connected to impulse piping and a differential pressure transmitter and FIG. 7 is a sectional view of the flange with integral three valve manifold taken along section line 7—7 in FIG. 6.

DESCRIPTION OF THE PREFERRED EMBODIMENTS

Figure 1:
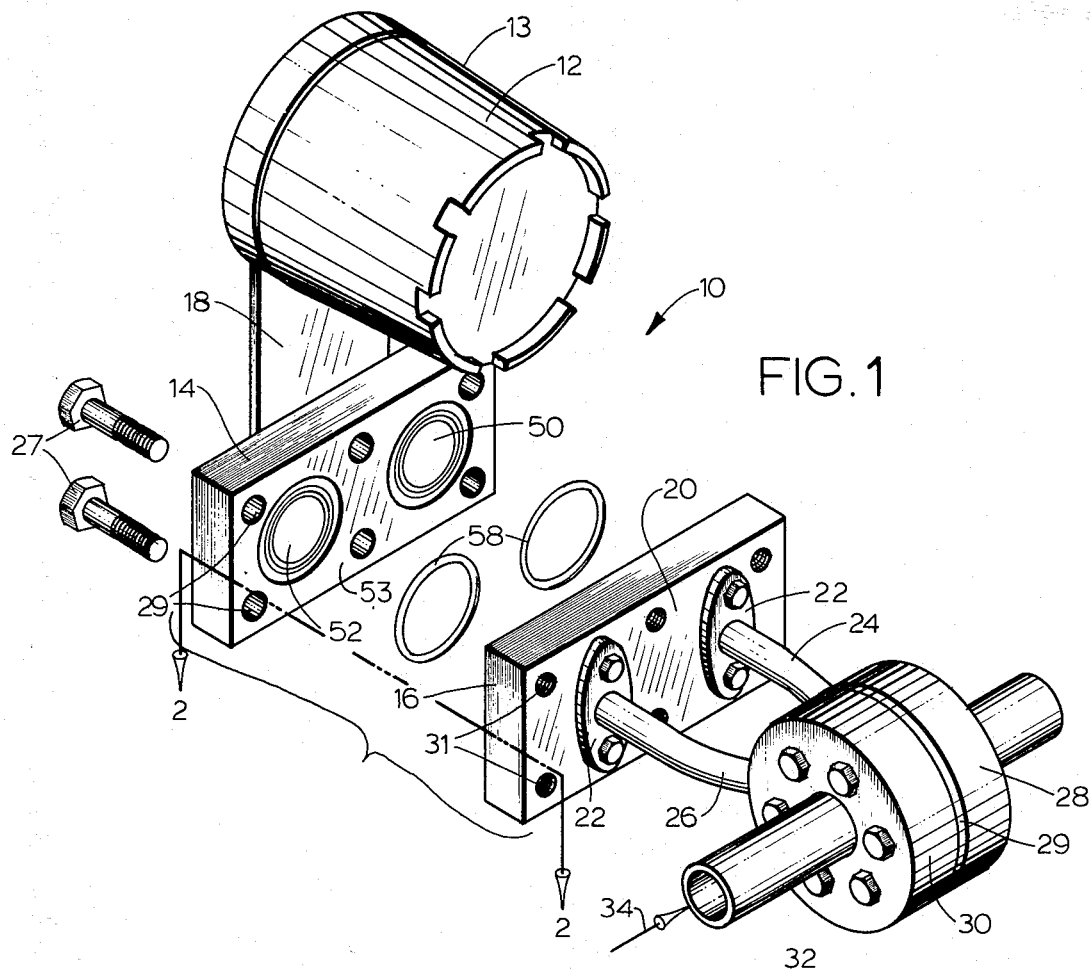
FIG. 1 is an exploded view of a preferred embodiment of the single flange connecting a conduit via impulse piping to a differential pressure transducer of a differential pressure transmitter.

A preferred embodiment of the instant invention is shown in FIG. 1, which depicts the improved differential pressure transmitter generally at 10. Differential pressure transmitter 10 has three major subcomponents; input/output unit 12, differential pressure transducer 14, and single flange 16. It is understood that the invention comprises both single flange 16 by itself and improved differential pressure transmitter 10 incorporating either single flange 16 or single flange with integral three valve manifold 17.

Figure 2:
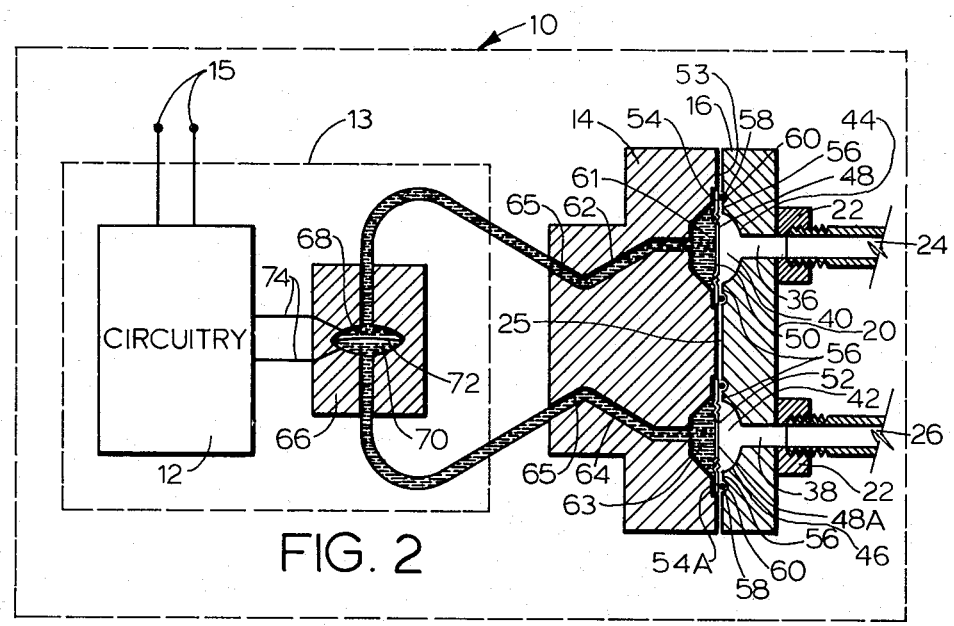
FIG. 2 is a sectional view taken along line 2—2 of FIG. 1 of a preferred embodiment of a single flange connected to a differential pressure transducer in which the transducer sensor module is located in the input/output housing and shown in section together with schematically shown input/output unit circuitry.

Physically, input/output unit 12, shown schematically in FIG. 2, is contained in input/output housing 13, which is connected to transducer 14 by neck 18. Single flange 16 is connected at a first face 20 to first and second impulse piping legs 24 and 26 respectively by means of flange adapter unions 22. Flange 16 is additionally connected at second face 25, shown in FIG. 2, to transducer 14. The connection is effected by conventional means, as for example in this embodiment by bolts 27. Bolts 27 are inserted through smooth bores 29 in transducer 14 and threaded into threaded bores 31 in flange 16. Preferably, flange 16 is formed from a massive body of high density material. A variety of shapes for flange 16, including a rectangular prism, have been found suitable.

Functionally, it is the purpose of differential pressure transmitter 10 to output a signal, preferably in industry standardized format, that is representative of the differential of two fluid pressures. When such differential pressure is the differential of pressures taken upstream and downstream of an orifice in a conduit, this differential may be correlated, through known relationships, to rate of flow in the conduit. To achieve this function, input/output unit 12 supplies power to differential pressure transducer 14 and receives an input signal representative of differential pressure from transducer 14. Input/output unit 12 preferably is comprised of circuitry such as in Frick U.S. Pat. No. 3,854,039, but other known circuitry will also function satisfactorily. Transducer 14 functions to be affected by the fluid pressure and to generate the input signal in response thereto. For packaging convenience, components performing the transducer function may be located in input/output housing 13. In addition to being a supporting structure, neck 18 preferably has a conduit containing the means of communication between input/output unit 12 and transducer 14 or separate components of transducer 14.

Input/output unit 12 operates on the input signal to generate the standardized output signal representative of differential pressure for transmission via leads 15, shown in FIG. 2, and for use external to differential pressure transmitter 10. It is understood that input/output unit 12 need not be affixed to transducer 14. It may be located remotely from but communicatively coupled to the other two subcomponents of differential pressure transmitter 10, as for example in a plant control room. Transducer 14 preferably has two portions, each of which is acted upon by a distinct fluid pressure. These two fluid pressures are compared to generate the input signal representative of differential pressure that is transmitted to input/output unit 12.

As previously described, flange 16 is connected to first and second impulse piping legs 24 and 26. Impulse piping legs 24 and 26 are any means supplying fluid under pressure to flange 16. In the embodiment shown in FIG. 1, first and second impulse piping legs 24 and 26 are small diameter inlet pipes, typically one half inch diameter, each of which is connected to flange 16 by a flange adapter union 22. First impulse piping leg 24 is additionally connected to orifice flange 28 while second impulse piping leg 26 is additionally connected to orifice flange 30. Orifice flanges 28 and 30 support an orifice plate (not shown) in recess 29 between them. Orifice flanges 28 and 30 are shown affixed to conduit 32 and, by means of conventional passageways therein, fluidly connect first and second impulse piping legs 24 and 26 to conduit 32. Flow in conduit 32 is indicated by arrow 34. The orifice plate restricts the flow in conduit 32 in a known manner, thereby generating a differential pressure, which is a function of rate of flow. It is understood that differential pressure transmitter 10 works equally well with flow in a direction opposite to that indicated by arrow 34. First impulse piping leg 24 intersects and is connected to conduit 32 downstream of the orifice plate and is connected at first face 20 to a first end of first fluid pressure passageway 36 shown in FIG. 2. Second impulse piping leg 26 intersects and is connected to conduit 32 upstream of the orifice plate and is connected at first face 20 to a first end of second fluid pressure passageway 38, also shown in FIG. 2.

As shown in FIG. 2, first and second fluid pressure passageways 36 and 38 function to separately fluidly couple first and second impulse piping legs 24 and 26 respectively to transducer 14. Accordingly, first and second fluid pressure passageways 36 and 38 open at a second end at second face 25 of flange 16 and are there fluidly coupled to first and second fluid chambers 40 and 42 respectively. First and second fluid chambers 40 and 42 are separately formed by wall 44 and wall 46 respectively, formed in second face 25 of flange 16, in cooperation with fluid facing sides of a first and second pressure sensing and transmitting means mounted in transducer 14 when flange 16 and transducer 14 are mated together in their normal position. In a preferred embodiment shown in FIG. 2, first and second pressure sensing and transmitting means comprise first and second isolation diaphragms 50 and 52 disposed in face 53 of transducer 14 and having fluid facing sides 48 and 48A respectively. It is understood that functionally the first and second pressure sensing and transmitting means may directly sense fluid pressure acting on the fluid facing sides thereof, as for example when they comprise strain gauges, or they may each comprise an isolation diaphragm for isolating a remote sensor element from the fluid, while each transmits a signal representative of the respective fluid pressure to associated signal transmission means for further transmission to such sensor element. First and second pressure sensing and transmitting means are so oriented as to facilitate fluidly sealing first and second fluid chambers 40 and 42 respectively when mated to flange 16.

As shown in FIG. 2, first and second isolation diaphragms 50 and 52 have fluid facing sides 48 and 48A respectively, the peripheries of which are defined by rims 54 and 54A respectively. Preferably, the planes defined by rims 54 and 54A are co-planar with respect to one another, although they need not be to be fully functional. First and second isolation diaphragms 50 and 52 are joined at their rims 54 and 54A to transducer 14 as by welding. When flange 16 and transducer 14 are mated together, rims 54 and 54A additionally abut opposing sealing portions 56 of second face 25 of flange 16, respectively. Sealing portions 56 are formed in second face 25 of flange 16 annular to the second end of both fluid passageways 36 and 38. Preferably the planes defined by the sealing portions 56 are substantially co-planar with respect to one another, though they need not be co-planar to be fully functional. When flange 16 and transducer 14 are mated together, the planes defined by rims 54 and 54A are substantially parallel to the plane formed by the opposing sealing portion 56 of second face 25.

First and second isolation diaphragms 50 and 52 are preferably chosen to be substantially unaffected by or, at least, resistant to the corrosive properties of the fluid. Structurally, they are selected to be able to withstand the pressure of the fluid, yet are flexible enough to deflect responsive to the fluid pressure acting thereon.

Sealing means 58, also shown in FIG. 2, are interposed between transducer 14 and flange 16 annular to first and second isolation diaphragms 50 and 52 to assist in effecting a substantially fluid tight seal for first and second fluid chambers 40 and 42 when transducer 14 and flange 16 are mated together. Sealing means 58 preferably are compressible O-rings compressed between flange 16 and transducer 14 in grooves 60 formed in sealing portion 56 of second face 25. Sealing means 58 are formed from materials preferably chosen to resist damage from the corrosive properties of the fluid.

First and second fluid cavities 61 and 63 are formed in transducer 14 in cooperation with first and second isolation diaphragms 50 and 52 respectively and are open to first and second fluid conduits 62 and 64 respectively. First and second fluid conduits 62 and 64 communicatively couple first and second isolation diaphragms 50 and 52 to sensor element 66. Both first and second fluid cavities 61 and 63 and first and second fluid conduits 62 and 64 preferably are filled with a substantially incompressible fluid such as silicone oil 65.

It is the purpose of differential pressure transmitter 10 to measure flow in conduit 32 as shown in FIG. 1. This is typically accomplished by restricting the flow with the orifice plate as previously described. With the flow as indicated by arrow 34 in conduit 32, flow past the orifice plate results in an area of high pressure immediately upstream of the orifice plate and an area of low pressure immediately downstream of the orifice plate in a known manner. Accordingly, in the preferred embodiment shown in FIGS. 1 and 2, second impulse piping leg 26 contains fluid at the higher pressure while the fluid in first impulse piping leg 24 is at the lower pressure. Lower fluid pressure from impulse piping leg 24 is conveyed through first fluid pressure passageway 36 in flange 16 shown in FIG. 2 to first fluid chamber 40 where it acts upon fluid facing side 48 of first isolation diaphragm 50. In a similar fashion, higher fluid pressure from impulse piping leg 26 is conveyed through second fluid pressure passageway 38 shown in FIG. 2 to second fluid chamber 42 where it acts upon fluid facing side 48A of second isolation diaphragm 52.

Fluid pressure acting on first and second isolation diaphragm 50 and 52 deflects such isolation diaphragms. These pressure inputs are transmitted to silicone oil 65, which functions as a means for transmitting the pressure to first and second portions 68 and 70 of sensor element 66. Through the medium of silicone oil 65, sensor element 66 is responsive to the differential between the pressures acting on first and second isolation diaphragms 50 and 52. Sensor element 66 resolves the high pressure and the low pressure and generates the input signal representative of the difference therebetween, ie. differential pressure. The input signal is transmitted via leads 74 to input/output unit 12. It is understood that sensor element 66 may be physically closely associated with isolation diaphragms 50 and 52 and supported in transducer 14 or may be located more remotely as for example in input/output unit housing 13 as shown.

In a preferred embodiment shown in FIG. 2, sensor element 66 is a capacitive device, formed in a known manner. In such device, measuring diaphragm 72 divides sensor element 66 into first and second portions 68 and 70. First portion 68 together with first fluid conduit 62 and first fluid cavity 61 comprise a first separate and sealed, fluid-filled volume. Similarly, second portion 70, second fluid conduit 64 and second fluid cavity 63 comprise a second separate and sealed, fluid-filled volume. Sensor element 66 is externally excited by input/output unit 12 via electrical leads 74. Responsive to differential pressure, measuring diaphragm 72 is deflected as a known function of the differential pressure, varying the capacitance of sensor module 66. The effect of the varied capacitance is to alter the external exciting signal. This alteration comprises the input signal and is sensed via electrical leads 74 at input/output unit 12.

The circuitry of input/output unit 12 operates on the input signal and presents a standardized output signal at electrical leads 15 representative of such capacitance which is in effect representative of differential pressure. At input/output unit 12, the input signal from sensor element 66 is preferably operated on in accordance with U.S. Pat. No. 3,854,039 held by the same assignee as the instant invention and which is incorporated herein by reference. It is understood that other desired sensor elements and input/output units work equally well with the instant invention and circuitry other than the cited patent can be used to excite and measure the sensed change in capacitance responsive to pressure.

Figure 3:
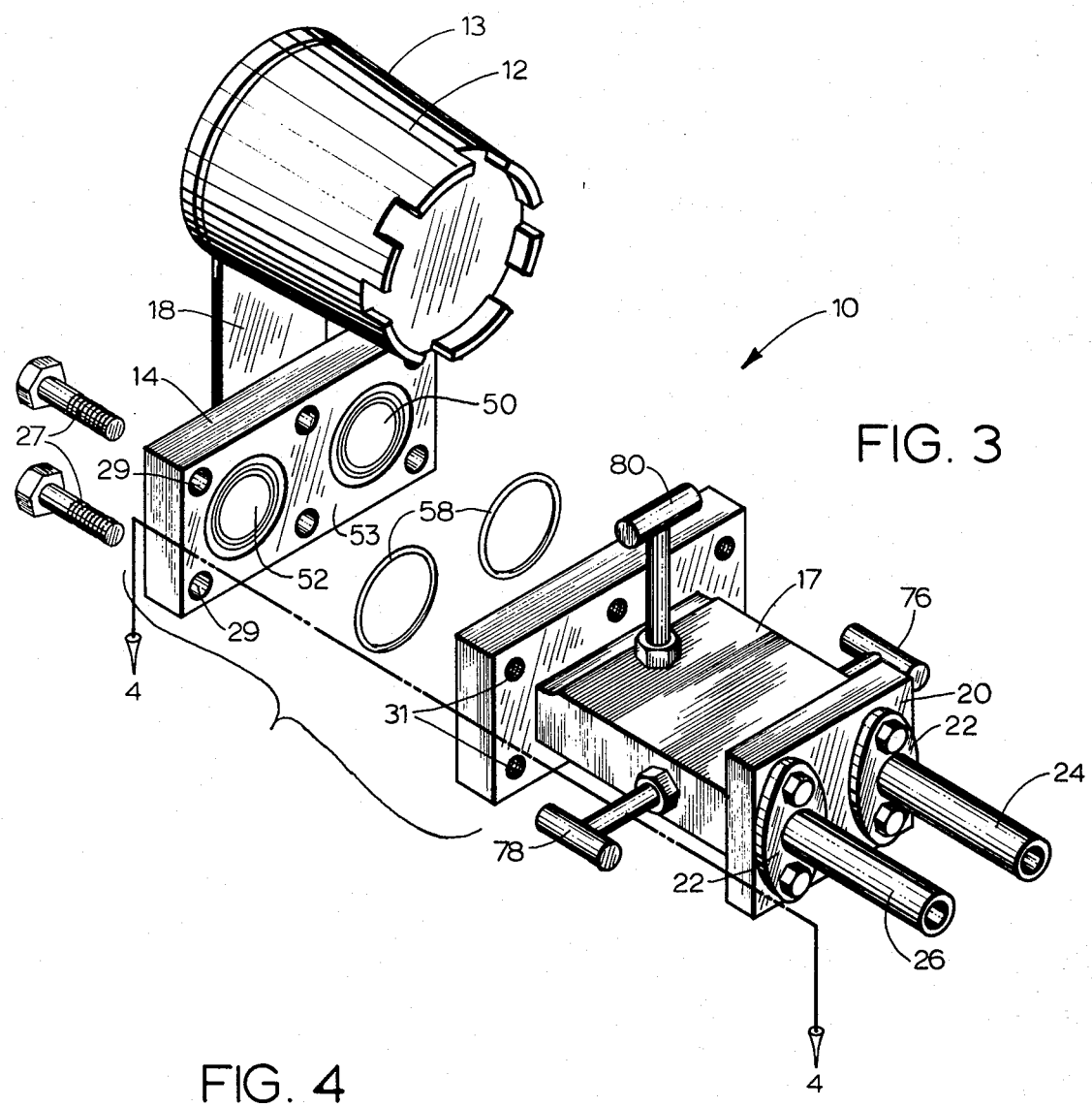
FIG. 3 is an exploded view of a preferred embodiment of the single flange with integral three valve manifold connecting impulse piping to a differential pressure transducer of a differential pressure transmitter.

The numbering in FIG. 3 corresponds to that in FIG. 1. It is understood that first and second impulse piping legs 24 and 26 are connected to a conduit substantially as shown in FIG. 1. FIG. 3 shows single flange with integral three valve manifold 17, hereinafter flange/-manifold 17, including first, second, and third valve handles 76, 78 and 80 respectively that comprise a portion of the three valve manifold. Flange/manifold 17 is a massive body constructed of high density material and preferably formed in substantially an I-shape when viewed from the side as shown. Flange/manifold 17 has a first face 20 at which first and second impulse piping legs 24 and 26 are connected by means of flange adapter unions 22 and a second face 25, obscured in FIG. 3, but shown in FIG. 4, adapted to be connected to transducer 14.

Figure 4:
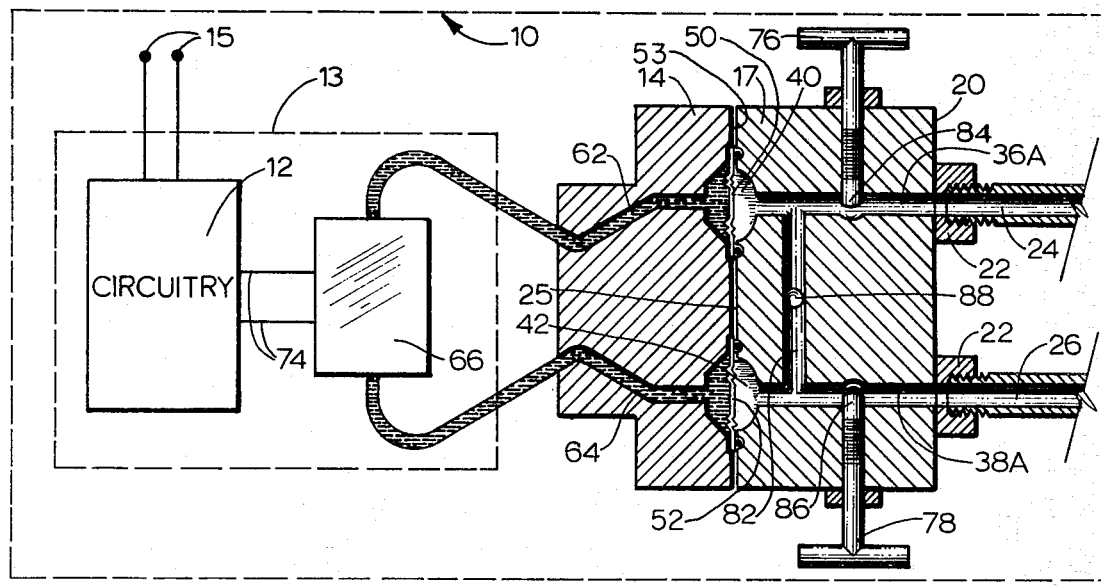
FIG. 4 is a sectional view taken along line 4—4 of FIG. 3 of a preferred embodiment of a single flange showing the integral three valve manifold connected to a differential pressure transducer, in which the transducer sensor module is located in the input/output housing and shown in section together with schematically shown input/output unit circuitry.

The numbering in FIG. 4 is consistent with that in the previous Figures. It is understood that transducer 14, as shown in FIG. 4, has the same features as transducer 14 shown in FIG. 2 including a sensor element 66 and associated signal transmission means. In addition to the features detailed in FIG. 3, FIG. 4 includes portions of the integral three valve manifold including specifically crossover passageway 82 and first, second and third valves 84, 86 and 88 respectively. As shown, first, second and third valves 84, 86 and 88 are threaded into flange/manifold 17 and are opened and closed by turning handles 76, 78 and 80 respectively. It is understood that other conventional valve structures are suitable to provide the desired function. First impulse piping leg 24, is connected at first face 20 by means of flange adapter union 22 to first fluid passageway 36A in flange/manifold 17. Second impulse piping leg 26 is connected at first face 20 by means of flange adapter union 22 to second fluid passageway 38A. First and second fluid passageways 36A and 38A and cross-over passageway 82 comprise an H-shaped series of passageways in flange/manifold 17. First and second fluid passageways 36A and 38A separately open at second face 25 and fluidly couple first and second impulse piping legs 24 and 26 respectively to transducer 14. Crossover passageway 82 intersects and fluidly couples first and second fluid passageways 36A and 38A. First valve 84 is mounted in flange/manifold 17 and intersects first fluid pressure passageway 36A between first face 20 and the intersection of cross-over passageway 82. First valve 84 is capable of selectively substantially isolating transducer 14 from the fluid pressure in first impulse piping leg 24 and of selectively admitting such pressure to affect transducer 14. Second valve 86 is similarly mounted in flange/manifold 17 intersecting second fluid passageway 38A between first face 20 and the intersection with cross-over passageway 82. Second valve 86 is capable of selectively substantially isolating transducer 14 from the fluid pressure in second impulse piping leg 26 and of selectively admitting such pressure to affect transducer 14. Third valve 88 is mounted in flange/-manifold 17 and intersects cross-over passageway 82. It is capable of selectively enabling fluid pressure exchange between first and second fluid passageways 36A and 38A and fluidly isolating such passageways from each other.

A major objective of a three valve manifold as incorporated in flange/manifold 16 is to permit calibration of the "zero" setting of transmitter 10 without removing transmitter 10 from service and without having to interrupt the flow in conduit 32. Under normal operating conditions, when differential pressure transmitter 10 is measuring the differential pressure, both first and second valves 84 and 86 are open and third valve 88 is closed. In this configuration, first and second fluid passageways 36A and 38A are fluidly isolated from each other. "Zero" calibration is accomplished by closing either first or second valves 84 and 86 and opening third valve 88. "Zero" calibration may be performed, as for example, when second valve 86 is closed, thereby isolating transducer 14 from the fluid pressure in second impulse piping leg 26. Fluid pressure from first impulse piping leg 24 is conveyed via fluid passageway 36A past open first valve 84 to fluid chamber 40. Third valve 88 is then opened and the pressure of the fluid in fluid passageway 36A is transmitted via cross-over passageway 82 to the fluid in second fluid passageway 38A and thence to second fluid chamber 42, thereby equalizing the fluid pressure in both first and second fluid chambers 40 and 42 at the pressure of the fluid in first impulse piping leg 24. Transducer 14 is then sensing the same pressure at both first and second isolation diaphragms 50 and 52 or, in other words, is sensing zero differential pressure. In this condition, the standardized output signal from input/output unit 12 may be calibrated to indicate zero differential pressure, equating to a known or zero flow in conduit 32.

Subsequent to performance of the calibration procedure, third valve 88 is again closed, thereby fluidly isolating first and second fluid pressure passageways 36A and 38A from each other. Second valve 86 is then opened, again pressurizing second fluid pressure passageway 38A and second fluid chamber 42 at the pressure of the fluid in second impulse piping leg 26 thereby returning differential pressure transmitter 10 to the previously described operating condition of measuring flow in conduit 32. It should be noted that, if desired, one of first and second impulse piping legs 24 and 26 may be at atmospheric pressure or some other reference pressure and the other leg at a pressure to be measured relative to the reference. The "zeroing" capability of input/output unit 12 is also available for this condition by following the above described procedures.

A further objective of a three valve manifold is to permit removal of differential pressure transmitter 10 for routine maintenance or replacement as may be required, without interruption of flow in conduit 32. This is accomplished by first closing both first and second valves 84 and 86, thereby fluidly isolating transducer 14 from conduit 32, and then removing bolts 27, shown in FIG. 3, from flange/manifold 17. Transducer 14 and input/output unit housing 13 may then be separated from flange/manifold 17. Reinstallation follows the reverse of the described procedure insuring that seal means 58 are renewed if such renewal is required to again effect fluid tight seals when transducer 14 is mated to flange/manifold 17.

FIGS. 5 and 6 show further preferred embodiments of the instant invention. The numbering is consistent with that of previous figures. FIG. 5 shows single flange 16A, a subcomponent of differential pressure transmitter 10A. Transducer 14A is affixed in a conventional manner to flange 16A by bolts 90 inserted through smooth bore 89 and threaded into threaded bore 91. Communication between transducer 14A and input/output unit 12A is via conduits internal to strut 92. In a preferred embodiment, the underside of transducer 14A, not shown in FIGS. 5 and 6, is substantially identical to face 53 of of transducer 14, including the disposition of first and second isolation diaphragms 50 and 52 therein. Sealing means 58 are disposed between single flange 16A and transducer 14A. Fluid conduits functionally similar to first and second fluid conduits as shown at 62 and 64 in FIG. 2 are disposed in strut 92 and communicatively connect such isolation diaphragms 50 and 52 to a sensor element 66, as shown in FIG. 2, which sensor element is disposed in input/output unit housing 13A remote from the isolation diaphragms. Where sensor elements such as strain gauges are employed in lieu of isolation diaphragms 50 and 52, they are fully disposed in transducer 14A and the input differential pressure signal capable of being operated on by input/output unit 12A is sent via communication means disposed in strut 92.

FIG. 6 shows another preferred embodiment of differential pressure transmitter 10A with flange/manifold 17A. In this embodiment, differential pressure transmitter 10A is as described for FIG. 5 and the numbering here is consistent with that of FIG. 5. Flange/manifold 17A is formed from a massive material and, in this embodiment, is a rectangular prism in shape. First and second impulse piping legs 24 and 26 are each connected to flange adapter unions 22 which in turn are conventionally affixed to the underside of flange/manifold 17A, as for example by bolts 95 threaded into threaded bores 94. In this embodiment, the underside of flange/manifold 17A constitutes the first face of flange/manifold 17A corresponding to the previously described first face 20 and the upper side constitutes second face 25A corresponding to second face 25 as shown in FIGS. 3 and 4. The fluid passageways defined in flange/manifold 17A preferably are substantially in the H-shaped pattern as shown in FIG. 4.

As is shown in section in FIG. 7, the first fluid passageway 36A extends from the intersection of first impulse piping leg 24 with flange/manifold 17A to exit at wall 44A of second face 25A, shown in FIG. 6, where it is aligned with first isolation diaphragm 50 mounted in the underside of transducer 14A. First valve 84A, attached to first valve handle 76A intersects the side of the first fluid passageway 36A. Similarly, the second passageway 38A exits at wall 46A, shown in FIG. 6, and couples second impulse piping leg 26 to second isolation diaphragm 52. Second valve 86A attached to second valve handle 78A, intersects the side of the second fluid passageway. Crossover passageway 82A connects the first and second fluid passageways 36A and 38A and is intersected by the third valve 88A, attached to third valve handle 80A.

In the preferred embodiments shown, transducers 14 and 14A preferably are functionally constructed in accordance with U.S. Pat. No. 3,618,390, held by the same assignee as the instant invention and incorporated herein by reference, but many other known transducers may be used. Although the present invention has been described with reference to preferred embodiments, those skilled in the art will recognize that changes may be made in form without departing from the spirit and scope of the invention.

What is claimed is:

1. A differential pressure transducer having a single coupling body defining body face surface means; separate first and second pressure inlets extending through the coupling body from a differential pressure sensor element and both inlets opening through the face surface means; first and second flexible isolation diaphragm means overlying the openings of the respective first and second inlets and being sealed to the coupling body at rim portions surrounding the openings of the inlets, respectively, to isolate the inlets from external fluids, the isolation diaphragms both facing in the same direction outwardly from the coupling body for receiving fluid under pressure from first and second sources of fluid, the difference in pressure of which is to be measured; a flange for carrying fluid pressure from such sources to the isolation diaphragms comprising a single massive body having first and second faces; first and second fluid passageways defined through the flange, each such passageway extending from the first face to the second face, the flange including means for coupling the first ends of the passageways to first and second sources of fluid under pressure, second ends of the passageways opening to the second face of the flange at separate locations, the flange being configured so the second face is complementary in configuration to the body face surface means and sealingly mates with the face surface means of the coupling body of the differential pressure transducer to simultaneously couple each passageway in the flange to a respective isolation diaphragm; means to convey fluid pressures acting on the isolation diaphragms to an associated differential pressure sensor element; each such fluid passageway being adapted to separately convey fluid under pressure to one of the isolation diaphragms of the differential pressure transducer when the flange passageways are connected to sources of fluid under pressure to be measured.

2. A transducer as claimed in claim 1 wherein the flange is substantially an I-shaped, massive body having a first end member and a second end member, which members are joined by a center member, and including a first face defined on the first end member and a second face defined on the second end member, the first and second passageways extending between the first and second faces.

3. A differential pressure transmitter as claimed in claim 2 wherein the second face of the flange has first and second sealing portions formed therein annular to the second ends of the first and second fluid passageways, respectively, for effecting a substantially fluid tight seal in cooperation with flexible isolation diaphragms of a differential pressure transducer when the flange is connected thereto.

4. A differential pressure transmitter as claimed in claim 3 wherein the first and second sealing portions are substantially co-planar, and are adapted to mate with a surface of a differential pressure sensor.

5. A differential pressure transmitter as claimed in claim 4 wherein the first and the second sealing portions each are additionally comprised of sealing ring means and groove means, the groove means defined in the respective sealing portion for supporting the sealing ring means, the sealing ring means being supported in the groove means and held in compression by a differential pressure transducer to which the flange is mounted to further effect a substantially fluid tight seal around the respective fluid passageway.

6. The transducer of claim 1 and further comprising:
separate first and second valve means in the flange for controlling transfer of fluid pressures through each of the first and second passageways defined through the flange; and
third valve means in the flange operable for controlling fluid flow between the first and second passageways in the flange.

7. In combination with a differential pressure transmitter having differential pressure transducer means, an input/output means coupled to the differential pressure transducer means for powering the transducer means and for receiving an output signal therefrom, the differential transducer comprising sensor element means having portions for sensing the differential in pressure between the pressures of two fluids under pressure and for generating an output signal representative of such differential pressure, first and second signal transmission means communicatively connected to the sensor element means, each for communicating a response signal representative of a fluid pressure separately to the sensor element means; first and second isolation diaphragm means communicatively connected to the first and second signal transmission means, respectively, the first and second isolation diaphragm means each having a rim defining a plane, and first surfaces oriented to be acted upon by the fluid under pressure to be sensed, respectively, and fluidly isolating the sensor element means from the fluid acting on the first surfaces, each isolation diaphragm means tending to deflect in response to fluid pressures acting thereon and any such deflection being communicated to the first and second signal transmission means, respectively, for transmission of signals representing such deflection to the sensor element means for generation of an output signal representative of the differential in the fluid pressures acting on the first and second isolation diaphragm means, which output signal is communicated to the input/output means, the improvement of a single flange means comprising a massive body having first and second faces, the first face of the flange means being adapted to be coupled separately to first and second inlet piping means carrying the first and second fluids under pressure, the pressure of which is to be sensed, the second face of the flange means having sealing portions configured for effecting a fluid seal between each isolation diaphragm means rim and the flange means, the plane of each isolation diaphragm means rim and the associated sealing portion being substantially parallel to each other, said flange means having first and second fluid passageway means defined therethrough, each such passageway means having a first end at the first face for coupling to one of the first and second inlet piping means, respectively, and a second end opening separately at the second face and being fluidly coupled to one of the first and second isolation diaphragm means within the area defined by the respective rim, each such fluid passageway means separately conveying fluid under pressure from a connected inlet piping means to the first surface of an associated isolation diaphragm means.

8. A differential pressure transmitter as claimed in claim 7 wherein the planes defined by the rims of the first and second isolation diaphragm means are co-planar with respect to one another.

9. A differential pressure transmitter as claimed in claim 8 wherein seal means are imposed between the flange means and the differential pressure transducer means annular to the first and second isolation diaphragm means for effecting a substantially fluid-tight seal.

10. A differential pressure transmitter as claimed in claim 9 wherein grooves are formed in the flange means means annular to the second end of both the first and second fluid passageway means and an o-ring is positioned in grooves for compression therein when the flange means is mated to the transducer means.

11. A differential pressure transmitter as claimed in claim 10 wherein the sensor element means is a capacitive type sensor.

12. In combination with a differential pressure transmitter having differential pressure transducer means, an input/output means coupled to the differential pressure transducer means for powering the transducer means and for receiving an output signal therefrom, the differential pressure transducer comprising sensor element means having portions for sensing the differential in pressure between the pressures of two fluids under pressure and for generating an output signal representative of such differential pressure, first and second signal transmission means communicatively connected to the sensor element means, each for communicating a response signal representative of a fluid pressure separately to the sensor element means; first and second isolation diaphragm means communicatively connected to the first and second signal transmission means, respectively, the first and second isolation diaphragm means each having a rim defining a plane and first surfaces oriented to be acted upon by the fluid under pressure to be sensed, respectively, and fluidly isolating the sensor element means from the fluid acting on the first surfaces, each isolation diaphragm means tending to deflect in response to fluid pressures acting thereon and any such deflection being communicated to the first and second signal transmission means, respectively, for transmission of signals representing such deflection to the sensor element means for generation of an output signal representative of the differential in the fluid pressures on the first and second isolation diaphragm means, which output signal is communicated to the input/output means, a single flange means comprising a massive body having first and second faces, the second face of the flange means being configured for mating to the differential pressure transducer, said flange means having first and second passageway means defined therethrough extending between said first and second faces, each such passageway having a first end adapted to be coupled to the first and second inlet piping means, respectively, and a second end opening separately at the second face, the second face having sealing portions configured for effecting a seal between each isolation diaphragm means rim and the flange means, the plane of each isolation diaphragm means rim and the associated sealing portion being substantially parallel to each other, the second ends of the passageways at the second face being fluidly coupled to one of the first and second isolation diaphragm means within the area defined by the respective isolation diaphragm means rim, said flange means further having a cross connect passageway defined therein extending between and intersecting the first and second fluid passageways means for fluidly connecting the first and second fluid passageway means to each other, first valve means mounted in the first fluid passageway means, second valve means mounted in the second fluid passageway means, each such first and second valve means being located in the respective fluid passageway means between the intersection of the cross connect passageway means with the respective first and second passageway means and the means for connecting to the respective inlet piping means, said first and second valve means being operable for selectively admitting and excluding fluid under pressure conveyed from a connected inlet piping means, and a third valve means mounted in the cross connect passageway means for selectively fluidly connecting the first and second passageway means to each other.

13. A differential pressure transmitter as claimed in claim 12 wherein the planes defined by the rims of the first and second isolation diaphragm means are co-planar with respect to one another.

14. A differential pressure transmitter as claimed in claim 13 wherein seal means are imposed between the flange means and the differential pressure transducer means annular to the first and second isolation diaphragm means for further effecting a substantially fluid-tight seal.

15. A differential pressure transmitter as claimed in claim 14 wherein grooves are formed in the flange means annular to the second end of both the first and second fluid passageway means and an o-ring is positioned in grooves for compression therein when the flange means is mated to the transducer means.

16. A differential pressure transmitter as claimed in claim 15 wherein the sensor element means is a capacitive type sensor.

* * * * *

UNITED STATES PATENT AND TRADEMARK OFFICE
CERTIFICATE OF CORRECTION

PATENT NO. : 4,466,290

DATED : August 21, 1984

INVENTOR(S) : Roger L. Frick

It is certified that error appears in the above-identified patent and that said Letters Patent is hereby corrected as shown below:

On the cover page, immediately after "References Cited" insert the following:

U.S. PATENT DOCUMENTS

| | | | |
|---|---|---|---|
| 4,193,420 | 3/1980 | J.E. Hewson | 137/356 |
| 2,871,881 | 2/1959 | J.E. Hewson | 137/597 |
| 4,182,362 | 1/1980 | J.E. Hewson et al | 137/340 |

Immediately after "FOREIGN PATENT DOCUMENTS" insert the following:

| | | |
|---|---|---|
| 1206824 | 9/1970 | Great Britain |
| 2424839 | 5/1974 | West Germany |

In the Abstract, in the last line, the word "pressure" should be --pressures--.

In column 3, line 68, cancel "Frick".

In column 9, line 37, after "second" insert --fluid--.

Signed and Sealed this

Thirtieth Day of April 1985

[SEAL]

Attest:

DONALD J. QUIGG

Attesting Officer     Acting Commissioner of Patents and Trademarks